Oct. 16, 1928.
A. TRAKALO
HORSESHOE
Filed Aug. 18, 1927
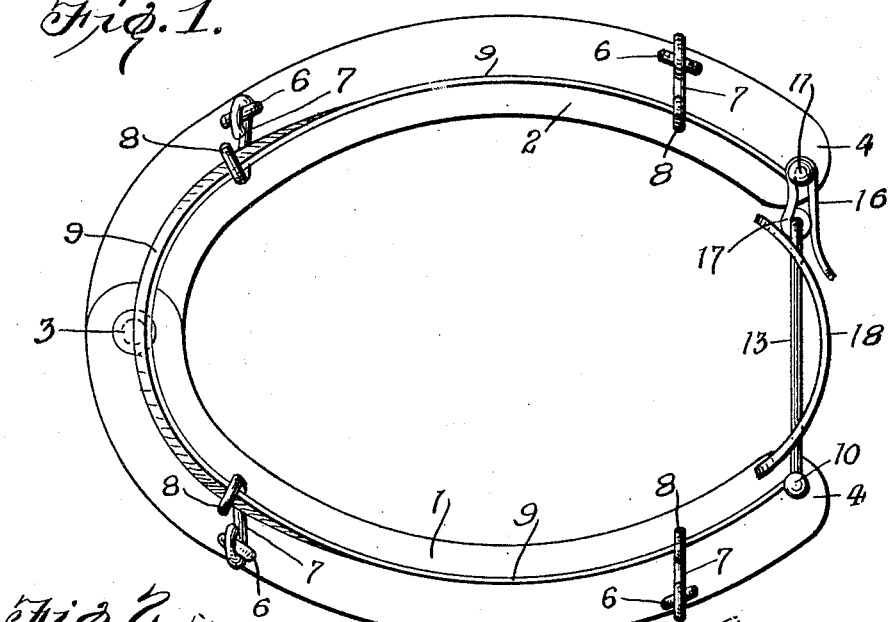
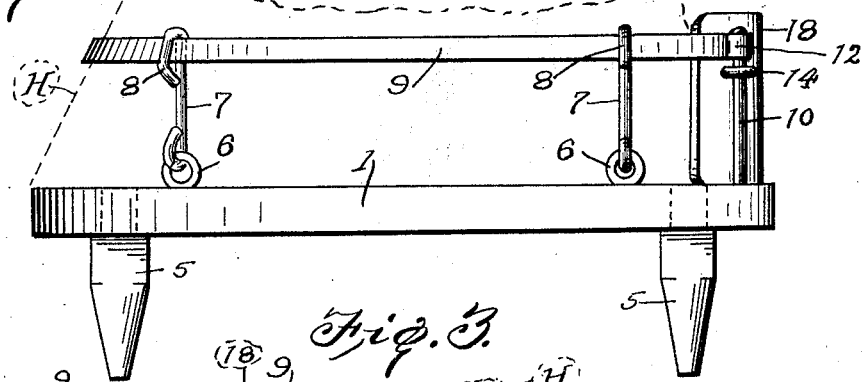
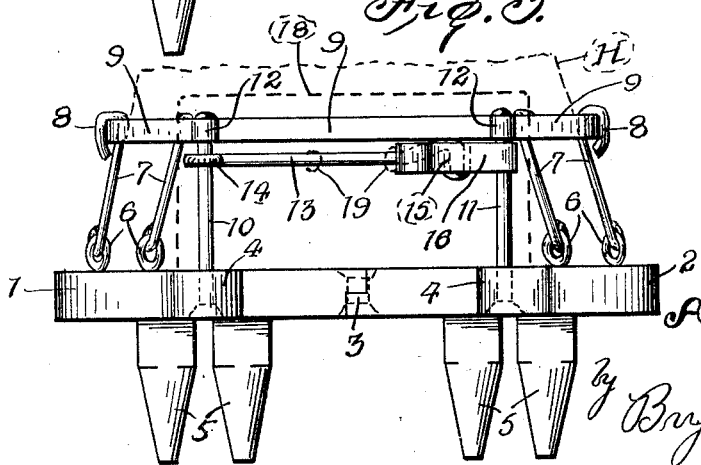
Inventor
A. Trakalo.
by Bryant & Lowry,
Attorneys Patented Oct. 16, 1928.

1,688,251

UNITED STATES PATENT OFFICE.

ANDREW TRAKALO, OF THE PAS, MANITOBA, CANADA.

HORSESHOE.

Application filed August 18, 1927. Serial No. 213,845.

This invention relates to certain new and useful improvements in horseshoes, and relates particularly to the idea of securing a shoe to the hoof of a horse in the absence of the usual nails or spikes driven into the hoof, and has for its primary object to provide a metallic retaining band or strap having link connections with a horseshoe and spaced upwardly thereof for engaging a hoof at a point above the lower edge thereof, with the rear ends of the strap anchored to vertical posts at the rear ends of the shoe.

A further object of the invention is to provide hoof-attaching means for a horseshoe of the above type wherein the horseshoe is formed of hinged sections connected together at their forward ends with a detachable connection at their rear ends for anchoring the shoe in position upon the hoof.

With the above and other objects in view that will become apparent as the nature of the invention is better understood, the same consists of the novel form, combination, and arrangement of parts hereinafter more fully described, shown in the accompanying drawing, and claimed.

In the drawing, wherein like reference characters designate corresponding parts throughout the several views, Fig. 1 is a top plan view of a horseshoe constructed in accordance with the present invention, showing the two hinged or pivoted sections thereof;

Fig. 2 is a side elevational view of the shoe with the hoof-attaching means, and with a portion of a hoof illustrated by dotted lines; and Fig. 3 is a rear elevational view of the same.

The horseshoe comprises side sections 1 and 2 of the usual formation pivoted together at their forward ends as at 3 with the rear ends 4 spaced from each other as shown in Figs. 1 and 3. The lower face of the shoe sections 1 and 2 carries the usual ground-engaging calks 5.

Eyebolts 6 are carried by the upper face of each shoe section 1 and 2 adjacent its outer edge and in a position to provide a clearance for the hoof H and with which eyebolts links 7 are connected, the upper free ends of the links carrying hooks 8 to provide anchoring and retaining means for the metallic band or strap 9. The band 9 is loosely disposed in the hooks 8 of the links to permit correct vertical positioning of the links 7 after the shoe is placed in position upon the hoof H. As shown more clearly in Figs. 1 and 3, vertical posts 10 and 11 are carried by the rear ends 4 of the side sections 1 and 2 respectively and to which the ends of the strap 9 are anchored as at 12.

In placing the shoe in position upon the hoof of a horse, the side sections 1 and 2 of the shoe are moved upon the hinge connection 3 to provide a sufficient clearance and when moved toward each other the strap 9 is disposed in inclosing relations with the hoof at points spaced upwardly from the shoe as shown in Figs. 2 and 3.

Devices are associated with the vertical posts 10 and 11 at the rear ends of the shoe sections 1 and 2 for retaining the shoe in position upon the hoof and comprise a link 13 pivoted at one end as at 14 to the post 10 with a hook 15 carried by the free end thereof that is directed toward and spaced from the vertical post 11. A resilient clasp 16 is formed at one end with a loop 17 inclosing the hook 15, the spring clasp 16 being positioned for engagement with the post 11 as shown in Fig. 1 for holding the shoe sections 1 and 2 against separating movement and also to cause binding engagement of the strap 9 upon the hoof H. To protect the rear side of the hoof from injury by the posts 10 and 11 and the fastening means, there is provided a leather plate 18 that has openings 19 therein through which the link 13 passes.

From the above detailed description of the device, it is believed that the construction and operation thereof will at once be apparent, as well as the novel features relating more particularly to the binding strap 9; and while there is herein shown and described the preferred embodiment of the present invention, it is nevertheless to be understood that minor changes may be made therein without departing from the spirit and scope of the invention as claimed.

What is claimed is:—

In a horseshoe of the type described, a shoe formed of side sections hinged together at their forward ends, links carried by the upper sides of the sections, vertical posts at the rear ends of the sections, a metallic strap threaded through the upper ends of the links and anchored at their ends to the posts, and a link attached at one end to one of said posts, and a spring clasp carried by the other end of the last-named link and detachably engaging the other post to retain the shoe on a hoof.

In testimony whereof I affix my signature.

ANDREW TRAKALO.